United States Patent [19]
Hill et al.

[11] 3,969,151
[45] July 13, 1976

[54] TREATMENT OF STAINLESS STEEL AND SIMILAR ALLOYS TO REDUCE HYDROGEN OUTGASSING

[75] Inventors: Eugene F. Hill, Belmont; Jack L. Walls, Saratoga, both of Calif.

[73] Assignee: Varian Associates, Palo Alto, Calif.

[22] Filed: Oct. 14, 1975

[21] Appl. No.: 622,301

Related U.S. Application Data

[60] Continuation of Ser. No. 436,557, Jan. 25, 1974, abandoned, which is a division of Ser. No. 318,139, Dec. 26, 1972, Pat. No. 3,833,430.

[52] U.S. Cl. .............................. 148/6.3; 148/6.35; 427/405
[51] Int. Cl.² .......................................... C23F 7/02
[58] Field of Search ............ 148/6.3, 6.35; 427/405

[56] References Cited
UNITED STATES PATENTS

| | | | |
|---|---|---|---|
| 2,442,223 | 5/1948 | Uhleg................................. | 148/6.35 |
| 2,703,298 | 3/1955 | Branson et al..................... | 148/6.35 |
| 2,960,421 | 11/1960 | Erxeben............................. | 148/16.6 |
| 3,345,218 | 10/1967 | Brookover et al.................. | 148/6.3 |

*Primary Examiner*—Ralph S. Kendall
*Assistant Examiner*—Charles R. Wolfe, Jr.
*Attorney, Agent, or Firm*—Stanley Z. Cole; Leon F. Herbert; John J. Morrissey

[57] ABSTRACT

Outgassing of hydrogen from high-vacuum system components made of stainless steel and similar alloys can be minimized if the metal surfaces to be exposed to the vacuum are treated according to the technique disclosed herein. First, an adherent layer comprising a mixture of oxides and nitrides is formed on the metal surfaces. This oxide and nitride mixture layer serves as a barrier to hydrogen diffusion. Then, a reduced layer having a low heat of adsorption for water is formed on the exposed surface of the oxide and nitride mixture layer. This reduced layer is made sufficiently thin to preclude outgassing of significant amounts of hydrogen into the vacuum system. In effect, a vacuum envelope is formed which outgasses only from a thin layer of reduced oxide.

7 Claims, 1 Drawing Figure

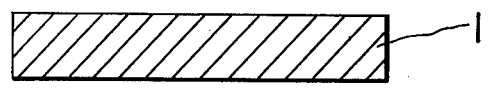
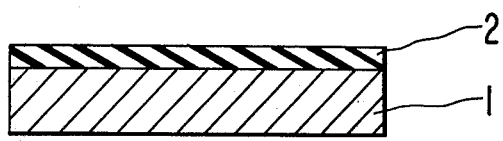
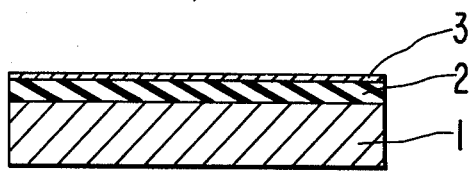

TREATMENT OF STAINLESS STEEL AND SIMILAR ALLOYS TO REDUCE HYDROGEN OUTGASSING

This is a continuation of application Ser. No. 436,557 filed Jan. 25, 1974, now abandoned; which is a division of application Ser. No. 318139, filed Dec. 26, 1972 now U.S. Pat. No. 3,833,430.

BACKGROUND OF THE INVENTION

1. Field of the Invention

This invention is a further development in high-vacuum technology, particularly with respect to hydrogen outgassing and pumping.

2. Description of the Prior Art

In a discussion of the state of the art appearing in *The Journal of Vacuum Science and Technology*, Vol. 6, No. 1, January/February 1969, pp. 166–173, the author, D.G. Bills, concluded: " . . . present day vacuum systems have ultimate pressure limited not by any failure of the pumping mechanism, but by inadequate or improper processing of the system materials." This limitation appears to be due to diffusion of dissolved gases, mainly hydrogen, out of only partially degassed portions of the systems." The rate of permeation of hydrogen through stainless steels at 371°C is in the order of $5 \times 10^{-3}$ cc(STP)mm/hr/cm$^2$/atm$^{0.5}$. It is known with respect to stainless steels, from which a major share of the components of a vacuum system are typically made, that an oxide layer on the surface of such a stainless steel component serves to decrease the rate of hydrogen permeation through the surface by a factor of $10^3$ as compared to an untreated surface. However, such oxide layers are generally nonadherent or only poorly adherent to stainless steel surfaces.

A substance known in brazing practice as "green oxide" or "chrome oxide" adheres readily to stainless steels. This substance, which will hereinafter be described more definitively, is formed as an adherent coating on brazing jigs to prevent brazing alloys from sticking to the jig surfaces. However, the so-called "green oxide" has not heretofore been used as a hydrogen diffusion barrier in high-vacuum technology because of the extremely high heat of adsorption of water on the "green oxide", about 30,000 calories per mole. The high affinity for water vapor in the ambient atmosphere that is exhibited by oxides which are adherent to stainless steels has inhibited the use of such oxides in high-vacuum applications because the water adsorbed by such oxides establishes a high partial pressure of water vapor in the vacuum system.

SUMMARY OF THE INVENTION

This invention provides a readily adherent coating which serves as a barrier to the outgassing of hydrogen from stainless steel and similar alloys. As used herein, the phrase "stainless steel and similar alloys" is understood to comprehend corrosion resistant steel alloys characterized by the inclusion of chromium as an alloy constituent. The coating can be applied by well-known techniques to components of vacuum systems known to the present art. Thus, by this invention, present technology can be used in applications requiring reliable routine operation at pressures as low as $10^{-11}$ torr.

A stainless steel component to be treated according to this invention is first treated by a chemical process which forms an adherent layer comprising an oxide, or more typically a mixture of oxides and nitrides, on the surface thereof. The oxide and nitride mixture layer provides a barrier to the outgassing of hydrogen by diffusion as atomic hydrogen through the metal lattice of the component. The oxide and nitride mixture layer is then treated by a chemical process which forms a thin reduced metal-like layer on the surface exposed to the vacuum chamber. The result of this two-step process is to produce a hydrogen diffusion barrier layer sandwiched between the underlying stainless steel body of the component and the thin reduced layer exposed to the vacuum. Thus, the hydrogen outgassing portion of the vacuum wall can be made extremely thin, having only the thickness of the exposed reduced layer which is in the order of 0.001 millimeters or less. The thinness of the vacuum envelope thus precludes significant hydrogen outgassing into the vacuum system.

BRIEF DESCRIPTION OF THE DRAWING

The drawing is a flow-chart illustrating the two-step process of this invention.

DETAILED DESCRIPTION OF THE INVENTION

A vacuum system component made of stainless steel or of a similar alloy is shown by reference number 1 in the drawing. The component could, for example, be part of an ultrahigh vacuum pumping system designed to attain pressures lower than $10^{-11}$ torr, i.e., pressures lower than would be attainable where significant outgassing of hydrogen from the system components can occur. The component might instead be part of a hydrogen detection system used in conjunction with a sodiumcooled nuclear reactor. The sodium leak detection system of such a reactor could be designed to detect the presence of hydrogen gas generated by the chemical interaction of leaking sodium with materials disposed in the immediate vicinity of the sodium circulation system. Such a hydrogen detection system would not function effectively if the components of the system were allowed to outgas hydrogen to a significant extent, because the outgassed hydrogen could mask and render undiscernible any hydrogen generated as a result of a sodium leak. Oxide coatings are known to be effective in reducing the rate of hydrogen diffusion out of stainless steels and similar alloys. Oxide coatings made by direct oxidation with air or oxygen, however, are generally nonadherent or only poorly adherent to stainless steels and similar alloys, and furthermore, tend to form porous rather than smooth coating surfaces. A porous surface is unsuitable as a high-vacuum envelope because the hydrogen can diffuse through it almost as rapidly as through unoxidized stainless steels. Furthermore, a porous surface has a heat of adsorbtion for water. In addition, such oxides are often unstable at high temperatures. However, a particular substance that does adhere well to stainless steels and similar alloys and that is stable at high temperatures, is known to brazing practice as "green oxide" or "chrome oxide". It seemed advantageous, therefore, to examine the properties with respect to hydrogen diffusion of the so-called "green oxide".

"Green oxide" or "chrome oxide" adheres readily to stainless steels and similar alloys, and is used as a coating on brazing jigs to prevent brazing alloys from sticking to the jig surfaces. The "green oxide" coating is formed on a stainless steel component by exposing the component to an atmosphere of dissociated ammonia saturated with water vapor so that the atmosphere has a dew point in the range from 10°C to 19°C, and heating the component in this atmosphere for approximately 20 minutes at a temperature in the range from 1000°C to 1100°C. An analysis of the "green oxide" coating thus formed on the stainless steel surface indicates that the so-called "green oxide" is a complex mixture of nitrides and oxides including the following compounds: $Fe_3N$, $CrN$, $Ni_3N$, $NiO$, and $Cr_2O_3$. Compounds of manganese and silicon were also found as minor or trace constituents. The precise proportions of the nitrides and oxides vary with the relative proportions of the constituents of the stainless steel, and probably also with such factors as temperature and exposure time to the dissociated ammonia atmosphere. It was found that by coating a stainless steel surface with the complex mixture of nitrides and oxides that comprises the "green oxide", the rate of diffusion of hydrogen from the stainless steel at 400°C can be reduced to twenty-five percent (25%) of the rate of hydrogen diffusion for untreated stainless steel at the same temperature. "Green oxide" adheres readily to stainless steel, as shown by reference number 2 in the drawing, but unfortunately, has a high surface adsorbtion capacity to water. The heat of adsorbtion of "green oxide" for polar molecules such as water is especially high, being on the order of 30,000 calories per mole. This characteristic renders "green oxide" particularly unsuitable as the exposed surface of a vacuum envelope. Water vapor is ever-present in the ambient atmosphere, and water molecules adsorbed onto the "green oxide" coating would establish such a high partial pressure of water vapor in the vacuum system that an unacceptably high base-line pressure for the system would result.

The low hydrogen permeation rate of "green oxide", estimated to be less than $5 \times 10^{-6} cc(STP)mm/hr/cm^2/atm^{0.5}$, is a desirable property for high-vacuum systems. However, the high heat of adsorbtion of "green oxide" with respect to water molecules renders a "green oxide" surface unsuitable as the surface of a vacuum envelope. According to this invention, therefore, the "green oxide" layer formed on the vacuum system component as described above is next placed in an atmosphere of anhydrous hydrogen. Such treatment will chemically reduce the exposed surface of the "green oxide" coating to a metal-like layer which has a relatively low heat of adsorbtion with respect to water molecules, i.e., approximately 20,000 calories per mole. It has been found empirically that exposure to the anhydrous hydrogen atmosphere at a temperature in the range from 1000°C to 1100°C for 10 minutes will produce on the "green oxide" coating an outer metal-like layer having sufficient strength to withstand the mechanical stresses that occur when the component is inserted into the vacuum system, yet having sufficient thinness to render negligible the quantity of hydrogen dissolved therein. The thickness of the outer metal-like layer produced by a 10 minute exposure to anhydrous hydrogen at 1000°C as indicated will be a 0.001 millimeters or less. This thickness can be varied by varying the exposure time. The result is a sandwich structure in which a hydrogen diffusion barrier in the form of a layer 2 composed of a mixture of oxides and other compounds is sandwiched between the underlying vacuum system component 1 on the one side and a thin reduced layer shown by reference number 3 on the other side. Analysis shows that the thin reduced layer exposed to the vacuum has substantially the same metal composition as the underlying vacuum system component.

In a typical vacuum system having untreated stainless steel components, a base-like hydrogen pressure of $8 \times 10^{-8}$ torr is obtainable at room temperature using existing commercial pumping apparatus. Upon heating the vacuum chamber to 400°C, the hydrogen pressure typically will rise to about $15 \times 10^{-8}$ torr due to the more rapid outgassing of hydrogen from the walls of the chamber at the higher temperature. Results substantially agreeing with the aforementioned figures were obtained by the inventors in a laboratory experiment. A similar experiment was performed with a system identical in all respects, except that in the second experiment, the stainless steel components were treated according to this invention. It was found that with treated stainless steel components the base-line hydrogen pressure at room temperature was only $2 \times 10^{-8}$ torr; and that upon heating the vacuum chamber to 400°C, the hydrogen pressure rose to only $4 \times 10^{-8}$ torr. This indicates a greatly reduced rate of hydrogen diffusion from the stainless steel as the result of the barrier layer being sandwiched between the thin reduced layer and the underlying stainless steel component.

The oxidation and reduction conditions described herein for sandwiching the hydrogen barrier layer between the underlying vacuum system component and the thin vacuum envelope surface may vary according to the type of stainless steel or other alloy used, the structural strength required of the component to be treated and design requirements of a given vacuum system. Such variations can be made without departing from the scope of the present invention. It is anticipated that the technique of this invention for reducing the outgassing of hydrogen can be practiced with any metal that forms protective oxides or nitrides, particularly high chromium alloys, so that the scope of this invention is limited only by the following claims.

What is claimed is:

1. The method of treating a stainless steel article intended for use as a component of a vacuum system, said method consisting of the following two steps, namely the first step of forming on the surface of said stainless steel article a first layer, said first layer comprising an oxidized form of said stainless steel and having a rate of permeation for hydrogen which is substantially less than the rate of permeation of hydrogen through said stainless steel, and the second step of forming on the surface of said first layer a second layer, said second layer being distinct from said first layer, said second layer comprising a chemically reduced form of said first layer, the heat of adsorption for water of said second layer being less than the heat of adsorption for water of said first layer, said second layer exhibiting less hydrogen outgassing than the untreated stainless steel article.

2. The method of claim 1 wherein said first layer is formed by exposing said article to an atmosphere of dissociated ammonia saturated with water vapor.

3. The method of claim 2 wherein said atmosphere of dissociated ammonia has a dew point in the range from 10°C. to 10°C.

4. The method of claim 2 wherein said article is heated in said atmosphere at a temperature in the range from 1000°C to 1100°C.

5. The method of claim 2 wherein said second layer is formed by exposing said first layer to an atmosphere of anhydrous hydrogen.

6. The method of claim 5 wherein said atmosphere of anhydrous hydrogen is at a temperature in the range from 1000°C to 1100°C.

7. The method of claim 5 wherein said second layer is exposed to said atmosphere of anhydrous hydrogen for a time that is less than the time to which said article is exposed to said atmosphere of dissociated ammonia.

* * * * *